United States Patent [19]
Hawkins

[11] 3,870,348
[45] Mar. 11, 1975

[54] DUAL SEALING JUNCTION FOR GAS VALVE AND MANIFOLD

[76] Inventor: Samuel D. Hawkins, 21 E. Mulberry St., Lebanon, Ohio 45036

[22] Filed: Nov. 19, 1973

[21] Appl. No.: 417,107

Related U.S. Application Data

[63] Continuation-in-part of Ser. No. 343,116, March 20, 1973, abandoned.

[52] U.S. Cl.............. 285/197, 251/146, 285/332.3
[51] Int. Cl............................................. F16l 41/00
[58] Field of Search ........ 285/197, 198, 199, 334.3, 285/334.1, DIG. 12, 189, 201, 222, 332, 332.2, 332.3, 192; 251/145, 146; 137/317, 318, 320, 321, 322, 323

[56] References Cited
UNITED STATES PATENTS

| | | | |
|---|---|---|---|
| 922,471 | 5/1909 | Glauber | 285/334.3 X |
| 1,301,245 | 4/1919 | Fox | 285/334.1 X |
| 1,578,808 | 3/1926 | Cummins | 285/334.3 X |
| 3,307,435 | 3/1967 | Floren | 137/318 X |
| 3,448,758 | 6/1969 | Mullins | 251/146 X |
| 3,509,905 | 5/1970 | Mullins | 285/197 X |
| 3,554,217 | 1/1971 | Ehrens | 285/197 X |
| 3,602,480 | 8/1971 | Demi | 285/197 X |
| 3,746,308 | 7/1973 | Vatterott | 285/197 X |

FOREIGN PATENTS OR APPLICATIONS

| | | | |
|---|---|---|---|
| 934,127 | 8/1963 | Great Britain | 285/197 |

*Primary Examiner*—Thomas F. Callaghan
*Attorney, Agent, or Firm*—Woodard, Weikart, Emhardt & Naughton

[57] ABSTRACT

Disclosed is a low-cost junctional construction for a gas valve and gas manifold pipe as used on a kitchen range or other gas appliance. The thin-walled gas manifold pipe, which may be of square or round configuration in cross-section, has an inwardly turned frusto-conical surface bordering the aperture supplying gas to the valve and the valve has an inlet tube with a matching frusto-conical outer surface at its tip. A conical gasket, flanged outwardly at its upper, wide end, cooperates with the frusto-conical surfaces and with a shoulder formed on the valve to provide a dual seal. A releasable clamp holds the two frusto-conical surfaces in sealing relation.

5 Claims, 5 Drawing Figures

PATENTED MAR 11 1975 3,870,348

DUAL SEALING JUNCTION FOR GAS VALVE AND MANIFOLD

This application is a continuation-in-part of my patent application Ser. No. 343,116, filed Mar. 20, 1973, now abandoned.

BACKGROUND OF THE INVENTION

Assembling and relatively locating the junctional components of gas burner controlling valves and the gas manifold, to which a series of valves may be connected as in a conventional gas range, has been a problem. A low-cost, sealed junction must be obtained and the junction must be capable of disassembly for valve replacement, cleaning or repair. Conventionally, gas manifold structures presently in use are drilled and tapped and the valve inlet tubes are threaded and assembled on the manifold pipe by turning the tubes into the pipe. Because of the necessity for cutting threads in the manifold at the valve inlet tube receiving aperture, it has previously been impossible to use thin walled tubing as the gas manifold pipe. This threaded type of assembly is a relatively high cost, time-consuming operation and the consequent inability to use thin walled tubing for gas manifolding has made forming the manifold pipe to the desired contour, end-sealing of the manifold, etc., also difficult and costly. The structure of the present invention provides an effective dual seal between the valve inlet tube and the manifold pipe which is not dependent on heavy wall thickness of the manifold but which makes possible the use of relatively thin walled, square or round, tubing for the gas manifold. Bending, or otherwise forming, and end-sealing of the manifold is thus facilitated.

The junctional construction of the present invention utilizes matching frusto-conical surfaces formed at the manifold pipe aperture and on the tip of the valve inlet tube to join the tube to the manifold. A bracket, or, in one embodiment, spring clips are used to hold the tube in sealed relation in the manifold aperture. A gasket, formed of a suitable deformable or elastomeric material, has a frusto-conical configuration and fits between the adjacent conical surfaces on the valve inlet tube and in the manifold wall. The gasket has an outwardly flange margin and this margin cooperates with an annular shoulder formed on the valve inlet tube just above the wide end of its frusto-conical surfaces. When the valve tube is drawn down on the manifold, the parallel conical surfaces on these members press against the gasket providing a relatively large, band shaped sealing area. The flange on the gasket is deformed somewhat against the valve tube shoulder to provide the second of the resulting dual seal.

DESCRIPTION OF THE PREFERRED EMBODIMENTS

Figure 1:
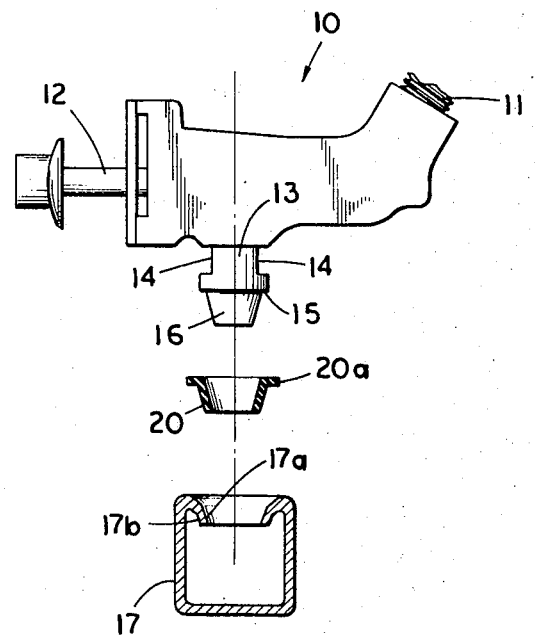
FIG. 1 is a exploded view showing the junctional construction of the present invention.
Figure 2:
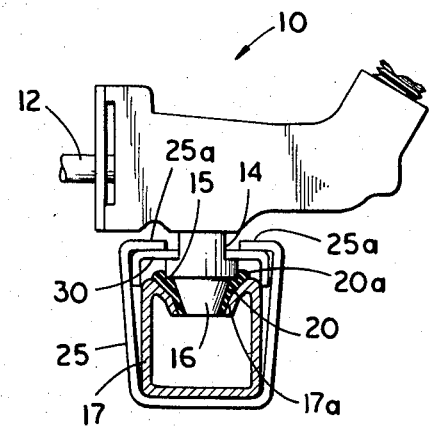
FIG. 2 is a side sectional view of the valve inlet tube installed in the manifold aperture.
Figure 3:
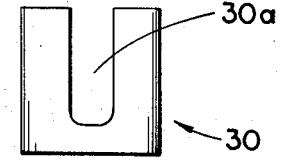
FIG. 3 is a top plan view of a portion of the mounting bracket shown in FIG. 1.

Referring initially to FIGS. 1—3, there is shown generally at 10 a conventional gas valve controlling a burner 11 and having a stem and manual control knob 12. The supply of gas to the valve for transmittal to the burner 11, depending upon the position of the knob 12, is transmitted through the valve inlet tube 13. The inlet tube 13 is provided with two diametrically opposite locating notches 14 and, adjacent its tip, the inlet tube 13 is provided with a frusto-conical outer surface indicated at 16. The conical surface 16 has, preferbly, an inclination of approximately 15° with the vertical and an annular, radially outwardly extending shoulder 15 formed in the inlet tube defines the upper margin of conical surface 16.

Figure 4:
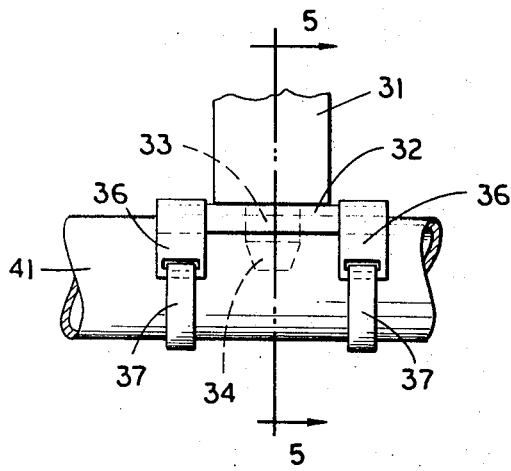
FIG. 4 is a side view of an inlet tube to gas manifold type junction which is a modified form of the present invention.
Figure 5:
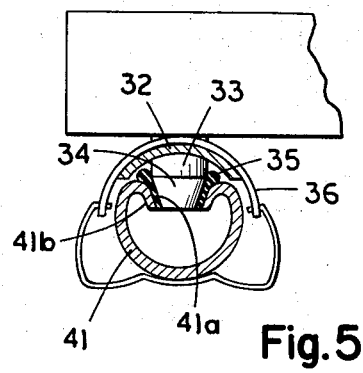
FIG. 5 is a sectional view taken generally along the line 5—5 of FIG. 4.

A gas manifold supply pipe 17 (FIG. 1) extends transversely to the valve 10 and, as shown in FIGS. 1 and 2, is rectangular or square in cross-section. This square cross-sectional configuration has advantages with regard to attaching components to the manifold tube, however, as shown in FIGS. 4 and 5, to be subsequently described, the manifold tube might be circular in cross-section. The manifold is relatively thin walled and is provided with an aperture which is pierced, the portion of the pipe adjacent the aperture being turned inwardly to form a frusto-conical surface 17a which matches the conical surface 16, the inwardly turned portion of the manifold pipe on which the conical surface 17a is formed being identified at 17b in FIG. 1.

Adapted to be interposed between the conical surfaces 16 and 17a is a frusto-conically shaped gasket 20 having an outwardly flanged, annular upper margin 20a. The gasket is formed of any suitable elastomeric material, such as rubber, or may be fabricated from a deformable material such as asbestos. The angle of inclination of the sides of the gasket corresponds to that of the conical surfaces 16 and 17a so that when squeezed between these two surfaces as shown in FIG. 2, it provides an effective seal, the sealing area having an inclined, annular band contour. An additional seal is provided by the deformation of the gasket 20 at its marginal edge 20a against the shoulder 15.

The assembled position of the valve tube 13, gasket 20 and manifold tube 17 is shown in FIG. 2. These components are held in assembled position by a suitable clamp means which takes the form of the U-shaped member 25 having inwardly turned end portions 25a which overlie and clamp in place a member 30. The member 30, as may be seen in FIG. 3, has a central slot 30a which receives the flattened side portions 14 of the tube 13. The downwardly turned side margins of the member 30 engage the adjacent sides of the mainfold tube 25, and may best be released by knocking the U-shaped band 25 sidewardly along the manifold tube 17 until the marginal portions 25a slide off the underlying legs of the slotted member 30. A screen member, that is, a tip formed of screen may also be inserted in the inlet tube 13 to depend from its open tip into the manifold pipe 17 where such screen or filter component is necessary because of the characteristics of the gas moving through the manifold pipe 17.

Referring to FIGS. 5 and 6, a modified form of the clamping structure is illustrated. In this form of the structure the valve 31 includes a mounting member 32 which extends from opposite sides of the valve inlet tube 33. The valve inlet tube is provided with a frusto-conical surface 34 similar to the surface 16 of the tube 13. The gas manifold 41 is similar to the gas manifold 17 of FIG. 1 but is circular in cross-section, and a frusto-conical surface 41a is formed on the inwardly turned portion 41b of the manifold pipe surrounding the aperture into which the inlet tube 33 extends. A gasket 35, identical to gasket 20 of FIG. 2, is interposed between the conical surfaces 34 and 41a.

As will be evident from FIG. 5 the member 32 is curved in cross-section and accommodates the curved outer surface of the manifold pipe 17. Two-pieced clamps, formed of components 36 and 37 encircle the manifold pipe and when in place, as may best be seen in FIG. 5, function to clamp the conical surface 34 of the inlet tube 32 into sealing engagement with the conical surface 41a of the manifold pipe. The clamp members 37 are detachable from the clamp members 36 permitting assembly and disassembly of the structure.

I claim:

1. In combination, a gas valve having an extending inlet tube and a gas manifold pipe adapted to supply gas to the valve, an aperture in the wall of said manifold pipe with a portion of pipe wall bordering said aperture being turned inwardly to form a frusto-conical surface extending within the manifold pipe, the inlet tube of said valve having the outer surface of its tip formed in a frusto-conical surface matching that of said pipe wall and having an annular radially outwardly extending shoulder defining the wider end margin of said frusto-conical surface, a deformable member having a conical configuration and an outwardly flanged margin, said deformable member being interposed between said pipe wall and inlet tube frusto-conical surfaces with said flanged margin adjacent said annular shoulder, and releasable clamp means cooperating with said valve inlet tube and said manifold pipe for drawing said two frusto-conical surfaces into sealing relation with said deformable member and drawing said annular shoulder into sealing engagement with said flanged margin of the deformable member.

2. The combination claimed in claim 1 in which said deformable member is fabricated of an elastomeric material.

3. The combination claimed in claim 1 in which said frusto-conical surfaces all have an inclination of approximately 15°.

4. The combination claimed in claim 1 in which said clamp means includes a mounting member carried by said valve and which extends from opposite sides of said inlet tube and in the direction of extension of said manifold pipe, and a resilient spring clip tightly encircling each extending portion of said mounting member and said manifold pipe.

5. The combination as claimed in claim 1 in which the manifold pipe is rectangular in cross-section configuration and fabricated of relatively thin-walled tubing.

* * * * *